United States Patent
Buehrer et al.

(10) Patent No.: US 6,363,103 B1
(45) Date of Patent: Mar. 26, 2002

(54) MULTISTAGE INTERFERENCE CANCELLATION FOR CDMA APPLICATIONS USING M-ARY ORTHOGONAL MODUATION

(75) Inventors: R. Michael Buehrer, Morristown, NJ (US); Sridhar Gollamudi, Notre Dame, IN (US); Steven P. Nicoloso, Parsippany, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/058,065

(22) Filed: Apr. 9, 1998

(51) Int. Cl.$^7$ .............................................. H04L 27/30
(52) U.S. Cl. ...................................................... 375/148
(58) Field of Search ................................ 375/206, 200, 375/149, 150, 130, 147, 148; 370/342

(56) References Cited

U.S. PATENT DOCUMENTS

| | | |
|---|---|---|
| 4,470,138 A | 9/1984 | Gutleber |
| 5,099,493 A | 3/1992 | Zeger et al. |
| 5,218,619 A | 6/1993 | Dent |
| 5,363,403 A | 11/1994 | Schilling et al. |
| 5,467,368 A * | 11/1995 | Takeuchi et al. ............ 375/148 |
| 5,644,592 A * | 7/1997 | Divsalar et al. ............ 375/206 |
| 5,872,776 A * | 2/1999 | Yang .......................... 370/342 |
| 5,956,333 A * | 7/1999 | Zhou et al. ................. 370/342 |
| 5,978,413 A * | 11/1999 | Bender ....................... 375/149 |
| 6,081,516 A * | 6/2000 | Yoshida et al. ............. 370/342 |
| 6,088,383 A * | 7/2000 | Suzuki et al. ............... 375/148 |
| 6,091,761 A * | 7/2000 | Popovic ...................... 375/150 |

FOREIGN PATENT DOCUMENTS

EP          0849886      *  6/1998         ................. 375/250

\* cited by examiner

Primary Examiner—Chi Pham
Assistant Examiner—Kevin M. Burd
(74) Attorney, Agent, or Firm—Stevens & Showalter, LLP (57) ABSTRACT

A multistage or parallel interference canceler (PIC) arrangement is disclosed for use in a communications system using code division multiple access (CDMA) with M-ary orthogonal modulation. All the M symbol waveforms, weighted according to their correlations with a despread signal, are combined to form a reconstructed symbol waveform for each user in each stage. The reconstructed symbol waveforms for all users are summed to form an estimated composite received signal having reduced interference which is subtracted from the composite received signal to generate a residual interference signal (RIS). While the total received signal is despread in the first stage of the PIC, the RIS or cancellation residue signal from the immediately preceding stage is used in succeeding stages of the PIC. A final decision is made by despreading the RIS from the final stage of the PIC, correlating it with the M symbol waveforms using an FHT. A weight vector from the final stage is then added to the output of the FHT. The real part or the squared magnitude of the resulting correlations, depending, respectively, on whether coherent or noncoherent demodulation is used, is then taken. The final symbol decision is made by selecting the symbol corresponding to the maximum component resulting decision statistic vector.

19 Claims, 4 Drawing Sheets

MULTISTAGE INTERFERENCE CANCELLATION FOR CDMA APPLICATIONS USING M-ARY ORTHOGONAL MODUATION

BACKGROUND OF THE INVENTION

The present invention relates in general to code division multiple access (CDMA) communications systems and, more particularly, to an improved method of interference cancellation for CDMA communications systems using M-ary orthogonal modulation.

Multiple access communications techniques enable multiple users, such as mobile telephones, to share the same path, for example a radio channel, to communicate to one receiver or base station at the same time. Examples of multiple access techniques include frequency division multiple access (FDMA) wherein different users are assigned to different frequency bands of the channel, time division multiple access (TDMA) wherein different users are assigned to non-overlapping time slots of the channel, and code division multiple access (CDMA). In CDMA, different users are assigned unique spreading codes, commonly pseudorandom noise (PN) codes, which are high bandwidth bitstreams used to multiply a respective baseband signal before transmission. Multiplying a baseband signal by a spreading code increases the bandwidth of the signal by a factor known as the spreading gain to spread the baseband signal across the channel.

Upon receipt at the base station, each user's signal is separated and decoded by first multiplying the total received signal by the complex conjugate of the desired user's spreading code. This removes the desired user's spreading code from the received signal or despreads the desired signal back to its original bandwidth and makes other user' signals look like high bandwidth noise. The despread signal, together with interference due to other user' signals, i.e. multiple access interference, is used in a conventional CDMA receiver to decode the desired user's transmitted bits, treating the interference as additive noise. The quality of reception at the base station can be substantially improved if the multiple access interference, rather than being treating as noise, is canceled from the received signal before decoding the desired user's signal.

To this end, interference cancellation (IC) techniques are employed to try to reduce multi-access interference in a CDMA receiver by estimating the interference due to other users and then subtracting the estimated interference from the received signal before the desired user's signal is decoded. A multistage or parallel interference canceler (PIC) consists of a number of concatenated stages which are usually identical to one another. The total received signal is passed to the first stage which makes tentative decisions as to the transmitted signals of all the users. While making a tentative decision on a particular user's signal, all other user' signals are treated as noise. For each user, an estimate of interference is obtained by respreading and combining the tentative signal decisions of all other users. The interference estimate is then subtracted from the received signal to form a "cleaner" signal for that user, which is passed to the next stage of interference cancellation. The next stage uses the cleaner signals for each user to again estimate and subtract interference. This is repeated for any desired number of stages with two to four stages being typical. Output signals from the final stage are used by a conventional CDMA decoder to make symbol decisions, i.e., to determine what symbols were in the received signal.

At each mobile telephone, bits of the user's signal can be modulated for example as binary phase-shift keying (BPSK) signals or as M-ary orthogonal signals (as in IS-95 North America CDMA standard) prior to spreading. With BPSK modulation, the baseband signal of a user takes the values +1 or −1 depending on whether the bit is a 0 or a 1. With M-ary orthogonal modulation, a group of $\log_2 M$ bits are mapped onto one of M Walsh codes, each Walsh code having M bits taking values −1 or +1. For example, M=64 in the uplink of IS-95 CDMA standard, so that 6 bits are modulated to one of 64 Walsh codes with each Walsh code being 64 bits long. All M codes are orthogonal to each other. Decoding a BPSK modulated signal after despreading involves integrating over the bit interval and hardlimiting the result. For M-ary orthogonal modulation, decoding is done by computing the correlations of the despread signal with all the M possible Walsh codes and determining the strongest among them.

Figure 1:
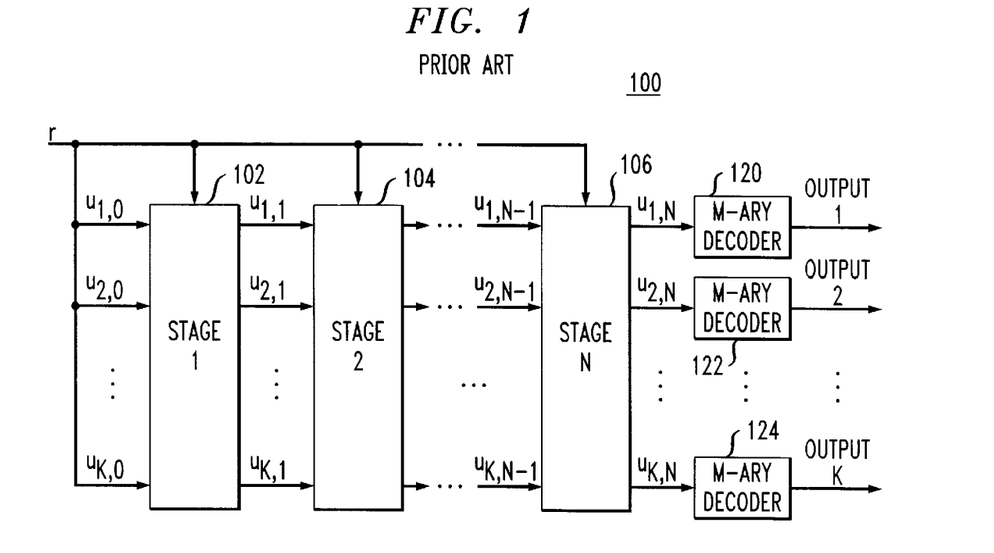
FIG. 1 is a schematic block diagram of a prior art parallel interference cancellation (PIC) arrangement.
Figure 2:
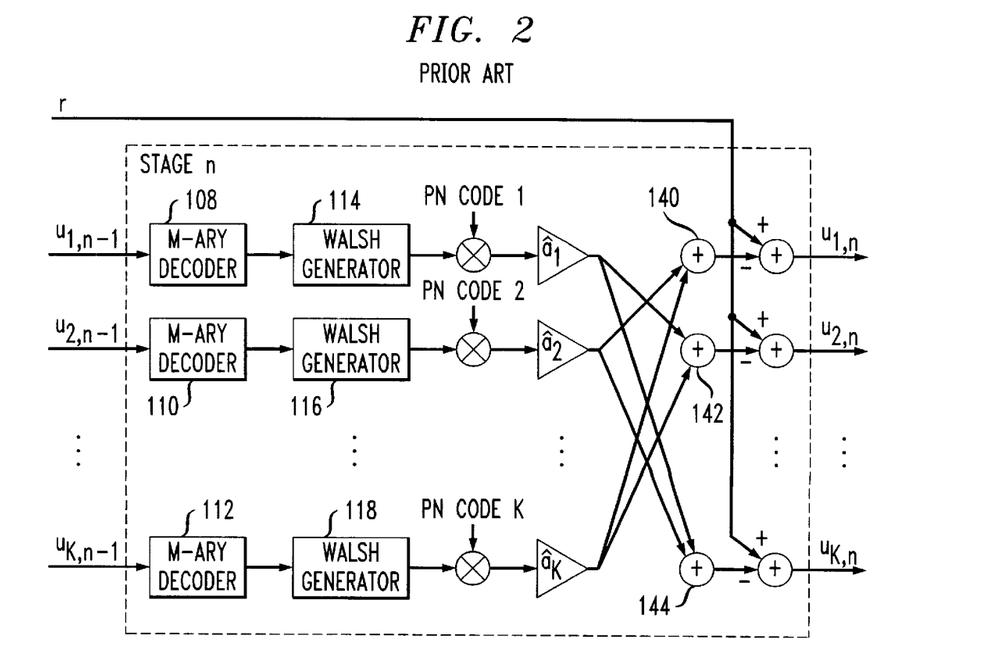
FIG. 2 is a schematic block diagram of an nth stage of the prior art PIC arrangement of FIG. 1.

FIGS. 1 and 2 illustrate a prior art parallel interference cancellation (PIC) arrangement for an IS-95-like CDMA system using M-ary orthogonal modulation with Walsh-Hadamard functions as symbol waveforms. FIG. 1 schematically shows a general architecture of an N-stage PIC 100. Carrier is removed from the received signal to obtain the complex baseband received signal r, which is the sum of all signals received from the K simultaneous telephones or users plus noise.

The output of each stage 102, 104, 106 of the PIC 100 is a set of estimates of all the user' received signals: $u_{1,n}, u_{2,n}, \ldots, u_{k,n}$, where lower case n is used to indicate the number of any stage and lower case k is used to indicate the number of any user. As shown in FIG. 2, signal $u_{k,n-1}$, which consists of user k's received signal plus an interference component, is used by the nth stage to reconstruct user k's received signal. One of K conventional decoders 108, 110, 112, coherent or non-coherent, for M-ary orthogonal CDMA signals are used to decide which one of the M Walsh functions or symbols was transmitted by the kth user. The one of decoders 108, 110, 112 also performs the despreading operation by multiplying the input signal with the complex conjugate of the kth user's PN code.

The M-ary decoders 108, 110, 112 are followed by Walsh code generators 114, 116, 118 which produce the corresponding symbol waveforms so that a single symbol waveform is used for reconstruction of each symbol waveform. The reconstructed symbol waveform for the kth user is then respread by multiplying it with the kth user's PN code and scaled by the complex valued channel estimate $\hat{a}_k$ to obtain the reconstructed user k's baseband received signal. For the kth user, the interfering signals from all other users thus reconstructed are subtracted from the total received signal r to produce $u_{k,n}$. If the symbol decisions in the nth stage are sufficiently accurate, $u_{k,n}$ will have a lower interference component than $u_{k,n-1}$. In general, the amount of interference reduced in the nth stage will depend on the correctness of symbol decisions in that stage.

The received baseband signal r is given to all the inputs for the first stage. The outputs of the Nth stage are used by conventional M-ary decoders 120, 122, 124 such as the ones described above to make final symbol decisions for each user. If the PIC 100 is followed by an error correcting decoder, such as a Viterbi decoder, for channel encoded data, the M-ary decoder may provide soft decisions instead of hard symbol decisions.

SUMMARY OF THE INVENTION

The present invention comprises a multistage or parallel interference cancellation (PIC) arrangement for use in a communications system using code division multiple access (CDMA) with M-ary orthogonal modulation, such as the uplink specified by the IS-95 North American CDMA standard. All the M symbol waveforms, weighted according to their correlations with a despread signal, are combined to form a reconstructed symbol waveform for each user in each stage. The reconstructed symbol waveforms for all users are summed to form an estimated composite received signal having reduced interference which is subtracted from the composite received signal to generate a residual interference signal (RIS). While the total received signal is despread in the first stage of the PIC, the RIS or cancellation residue signal from the immediately preceding stage is used in succeeding stages of the PIC. A final decision is made by despreading the RIS from the final stage of the PIC, correlating it with the M symbol waveforms using a Fast Hadamard Transform (FHT). A weight vector from the final stage is then added to the output of the FHT. The real part or the squared magnitude of the resulting correlations, depending, respectively, on whether coherent or noncoherent demodulation is used, is then taken. The final symbol decision is made by selecting the symbol corresponding to the maximum component of the resulting decision statistic vector.

In accordance with one aspect of the present invention, a method of decoding a spread spectrum composite signal, the composite signal comprising a plurality of user signals that have been modulated using M-ary orthogonal signals and spread with a plurality of respective codes, comprises a plurality of interference cancellation steps performed in succession. The steps are performed in response to an input cancellation residue signal and input weight signals corresponding to preceding estimated correlation signals of the users to the M-ary orthogonal signals with each successive step comprising the performance for each one of the user signals of a series of substeps. A despread input cancellation residue signal is generated by despreading the input cancellation residue signal. The despread input cancellation residue signal is correlated with the M-ary orthogonal signals to generate a first correlation signal. The first correlation signal is added to an input weight signal for the user to generate a second correlation signal which is operated on with a decision function to generate an output weight signal for the user. An inverse transform of the output weight signal for the user is performed to reconstruct the user signal. The user signal is spread to generate an estimate of a portion of the composite signal for the user.

Preferably, the M-ary orthogonal signals are M Walsh functions and the step of correlating the despread input cancellation residue signal with the M-ary orthogonal signals to generate a first correlation signal comprises the step of taking the Fast Hadamard Transform (FHT) of the despread input cancellation residue signal. Where the FHT is used, the step of performing an inverse transform of the output weight signal for the user to reconstruct the user signal comprises the step of taking the Inverse Fast Hadamard Transform of the output weight signal for the user. For the first interference cancellation step, the residue signal comprises a received signal and the input weight signals comprise zero signals. Preferably, the step of operating on the second correlation signal with a decision function to generate an output weight signal for the user comprises the step of operating on the second correlation signal with a sigmoid decision function or linear decision function.

In accordance with another aspect of the present invention, a method for interference cancellation from a received spread spectrum composite signal, the received composite signal comprising a plurality of user signals that have been modulated using M-ary orthogonal signals and spread with a plurality of respective spreading codes, comprises despreading the received composite signal with a plurality of respective despreading codes corresponding to the plurality of respective spreading codes to form a despread composite signal for each user. The despread composite signal for each user is correlated with the M-ary orthogonal signals to generate a correlation signal for each user. The correlation signal for each user is operated on using a decision function to generate a weight signal for each user. An estimated received signal is reconstructed for each user from the weight signal, and the estimated received signals for all of the users are combined to generate an estimated received composite signal.

The method may further comprise subtracting the estimated received composite signal from the received composite signal to generate a cancellation residue signal and despreading the cancellation residue signal with a plurality of respective despreading codes corresponding to the plurality of respective spreading codes to form a despread cancellation residue signal for each user. The despread cancellation residue signal for each user is then correlated with the M-ary orthogonal signals to generate a first correlation signal for each user. The first correlation signal for each user is added to the weight signal for each user to generate a second correlation signal for each user. The second correlation signal for each user is operated on with a decision function to generate an updated weight signal for each user. An updated estimated received signal is reconstructed for each user from the updated weight signal for each user, and the updated estimated received signals for all of the users are combined to generate an updated estimated received composite signal. The method may further comprise step of subtracting the updated estimated received composite signal from the received composite signal to generate an updated cancellation residue signal.

In accordance with yet another aspect of the present invention, apparatus for decoding a spread spectrum composite signal, the composite signal comprising a plurality of user signals that have been modulated using M-ary orthogonal signals and spread with a plurality of respective codes, comprises a plurality of interference cancellation stages. Each of the stages is responsive to an input cancellation residue signal and input weight signals corresponding to preceding estimated correlation signals of the users to the M-ary orthogonal signals. Each stage comprises for each of the user signals means for despreading the input cancellation residue signal to generate a despread input cancellation residue signal. Means provide for correlating the despread input cancellation residue signal with the M-ary orthogonal signals to generate a first correlation signal. Means provide for adding the first correlation signal to an input weight signal for the user to generate a second correlation signal. Means provide for operating on the second correlation signal with a decision function to generate an output weight signal for the user. Means provide for performing an inverse transform of the output weight signal for the user to reconstruct the user signal. And, means provide for spreading the user signal to generate an estimate of a portion of the composite signal for the user.

In accordance with still another aspect of the present invention, apparatus for interference cancellation from a received spread spectrum composite signal, the received composite signal comprising a plurality of user signals that have been modulated using M-ary orthogonal signals and spread with a plurality of respective spreading codes, comprises means for despreading the received composite signal with a plurality of respective despreading codes corresponding to the plurality of respective spreading codes to form a despread composite signal for each user. Means provide for correlating the despread composite signal for each user with the M-ary orthogonal signals to generate a correlation signal for each user. Means provide for operating on the correlation signal for each user with a decision function to generate a weight signal for each user. Means provide for reconstructing an estimated received signal for each user from the weight signal. And, means provide for combining the estimated received signals for all of the users to generate an estimated received composite signal.

It is, thus, an object of the present invention to provide an improved multistage interference canceler for CDMA communications systems using M-ary orthogonal modulation; to provide an improved multistage interference canceler for CDMA communications systems using M-ary orthogonal modulation wherein all M symbol waveforms, weighted according to their correlations with a despread signal, are combined to form a reconstructed symbol waveform for each user in each stage; and, to provide an improved multistage interference canceler for CDMA communications systems using M-ary orthogonal modulation wherein a cancellation residue and individual weight vectors of all users are used for interference cancellation.

Other objects and advantages of the invention will be apparent from the following description, the accompanying drawings and the appended claims.

DETAILED DESCRIPTION OF THE INVENTION

Figure 3:
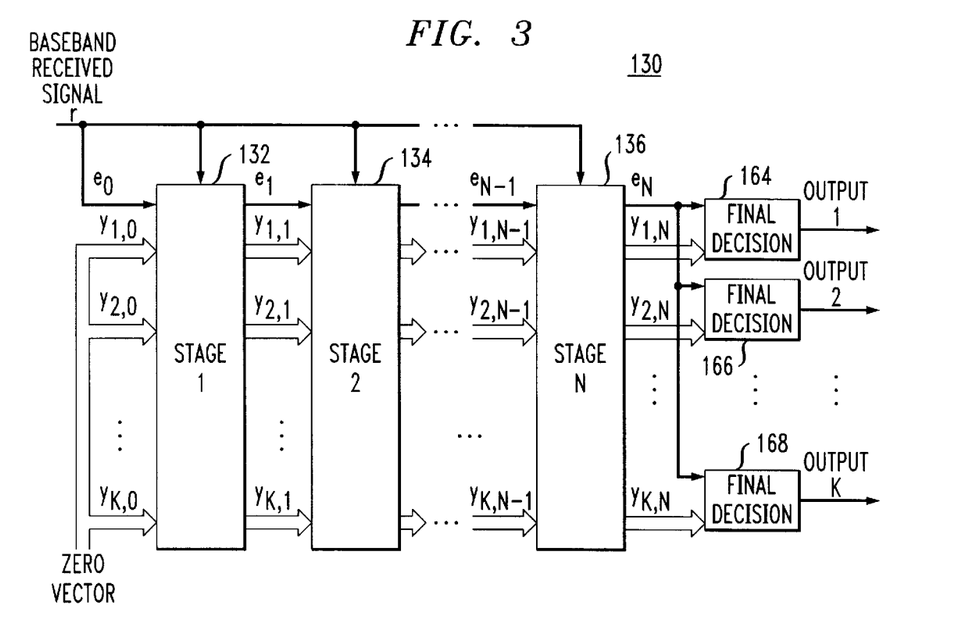
FIG. 3 is a schematic block diagram of the PIC arrangement of the present invention.

The general architecture of the multistage interference canceler 130 of the present invention is schematically illustrated in FIG. 3. Similar to the prior art PIC, the proposed interference canceler (IC) includes N stages 132, 134, 136, each of which is intended to reduce the interference component due to all other user' signals present in each user's signal. In FIG. 3, $e_n$, where n is the number of any stage, represents what is referred to as the cancellation residue, which is equal to the difference between the complex baseband received signal or composite received signal r and the sum of the reconstructed signals of all users in the nth stage. The exception is $e_0$, which is set equal to the received signal r. Each of the vectors $y_{1,n}, \ldots, y_{k,n}$ consists of M complex numbers. The vector $y_{k,n}$ represents the complex valued weights corresponding to the M symbols that combine to form the reconstructed signal for the kth user in the nth stage. Also, all input vectors to the first stage, $y_{1,0}, \ldots, y_{K,0}$, are set equal to the zero vector.

Figure 4:
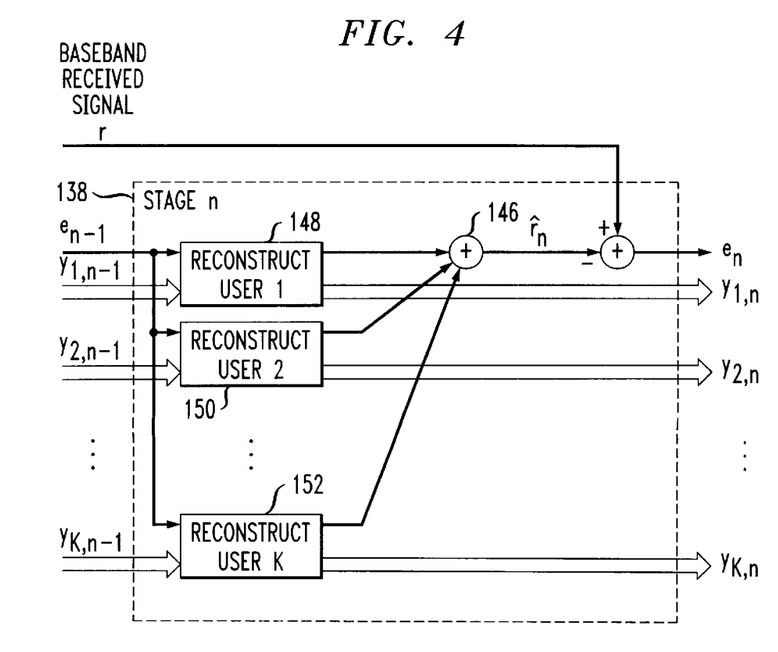
FIG. 4 is a schematic block diagram of an nth stage of the PIC arrangement of FIG. 3.

As shown in FIG. 4, the nth stage 138 computes reconstructed signals for all K users and sums them up to produce the estimated total received signal $\hat{r}_n$. Residual interference $e_n$ is then computed by subtracting the estimated total received signal $\hat{r}_n$ from the actual received signal r. This is in contrast with the prior art PIC of FIGS. 1 and 2 wherein for each user the reconstructed signals from all other users are summed and subtracted from the received signal. Thus, the prior art PIC requires K summers 140, 142, 144 that sum K−1 signals each, while the PIC of the present invention requires just one summer 146 that sums K signals. Further, unlike the prior art reconstruction, which decodes each user's symbol and uses that symbol to reconstruct the user's contribution to interference, the reconstruction blocks 148, 150, 152 compute optimal estimates of each user's signal that minimize the mean squared errors between the true received signal from that user and the reconstruction of that user's signal.

Figure 5:
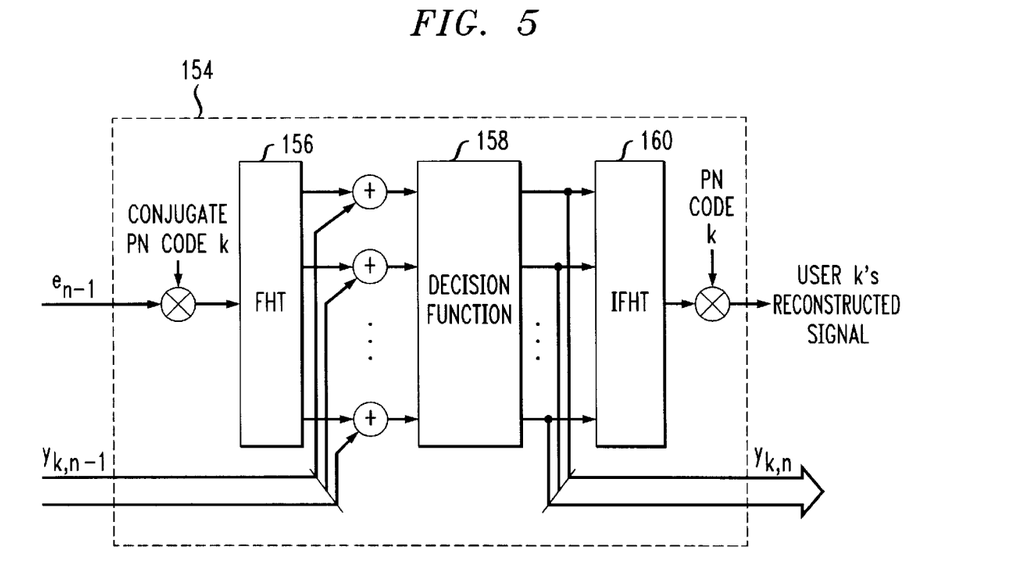
FIG. 5 is a schematic block diagram of a reconstruct block of the nth stage of the PIC arrangement of FIG. 4.

A schematic block diagram of a reconstruction block 154 for the kth user in the nth stage is shown in FIG. 5. The residual interference from the previous stage, $e_{n-1}$, (the actual received signal r for the first stage) is first despread by multiplying it with the complex conjugate of the kth user's pseudorandom noise (PN) code. This is followed by performance of a Fast Hadamard Transform (FHT) 156 which efficiently computes the complex valued correlations of its input with the M Walsh waveforms. The M-length correlation vector obtained from the FHT 156 is added to the weight vector $y_{k,n-1}$ from the preceding stage (a zero vector for the first stage). The resulting vector corresponds to the correlations of user k's received signal estimate at the input to the nth stage with the M symbol waveforms or Walsh waveforms.

Figure 6:
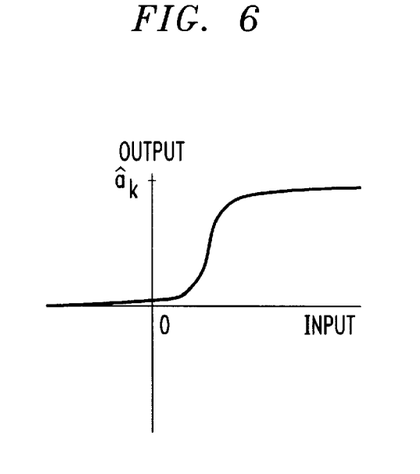
FIG. 6 is a graphical representation of transfer characteristics for the output versus the input of a typical decision function for the reconstruct block of FIG. 5.

Each correlation is then operated on by a decision function 158 whose output corresponds to the confidence level that the particular symbol is the true symbol. Using the minimum mean-squared error (MMSE) criterion, the optimal decision function for the mth symbol ($1 \leq m \leq M$) is given by the following sigmoid, $$y_{k,n,m} = \hat{a}_k \frac{\exp\left[\frac{\text{Re}\{\hat{a}_k^* x_{k,n,m}\}}{\sigma_{k,n}^2}\right]}{\sum_{l=1}^{M} \exp\left[\frac{\text{Re}\{\hat{a}_k^* x_{k,n,l}\}}{\sigma_{k,n}^2}\right]}$$

where $y_{k,n,m}$ is the mth output of the decision function for user k in the nth stage and $x_{k,n,l}$ is the lth input to the decision function in the reconstruction block for user k in the nth stage. In the above formula, 'exp[.]' refers to the exponential operation, 'Re{.}' corresponds to taking the real part of the argument and the superscript '*' represents the complex conjugation. Also, $\hat{a}_k$ is the estimate of user k's complex valued amplitude, and $\sigma_{k,n}^2$ is the variance of the interference plus noise seen at the input to the decision function for user k in the nth stage (the variance is the same at all the M inputs). The magnitude of the complex valued amplitude of user k is equal to the square-root of the user's received power, and its phase is equal to the carrier phase of user k's signal in the received signal. Both $\hat{a}_k$ and $\sigma_{k,n}^2$ can be computed from the received data. Accurate estimates of the complex amplitudes can be obtained if carrier phases are known with the help of pilot signals. FIG. 6 shows the transfer characteristics between the mth input and the mth output of a typical decision function, keeping the remaining inputs constant and assuming that $\hat{a}_k$ and $x_{k,n,m}$ are real.

Figure 7:
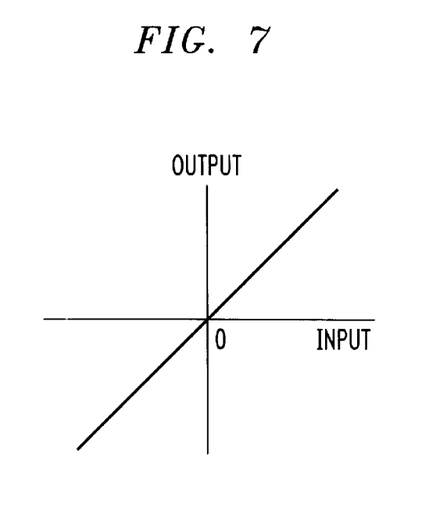
FIG. 7 is a graphical representation of transfer characteristics of a linear decision function which can be used for the reconstruct block of FIG. 5.

If complex valued amplitude estimates, $\hat{a}_k$, are not available, or if the additional complexity involved in evaluating the optimal decision function cannot be expended, a linear decision function which does not require the computation of $\hat{a}_k$ and $\sigma_{k,n}^2$ can be used. The linear decision function simply passes the mth input to the mth output, as shown in FIG. 7, i.e., $y_{k,n,m}=x_{k,n,m}$. In other words, using a linear decision function is equivalent to removing the decision function block and connecting each of its inputs to the corresponding outputs. The reconstruction block will not be optimal in the MMSE sense if the linear decision function is used.

The reconstructed symbol waveform for user k is then computed by summing all the M Walsh waveforms weighted by the corresponding complex valued outputs of the decision function 158. This operation can be efficiently performed by using an Inverse Fast Hadamard Transform (IFHT) 160, whose operation is identical to that of the FHT except for a scaling factor. The vector $y_{k,n}=[y_{k,n,1}, \ldots, y_{k,n,m}]$, one output of the reconstruction block 154, is passed to the following stage. The reconstructed symbol waveform at the output of the IFHT 160 is respread by multiplying it with user k's PN code to obtain the estimate of user k's received signal.

Figure 8:
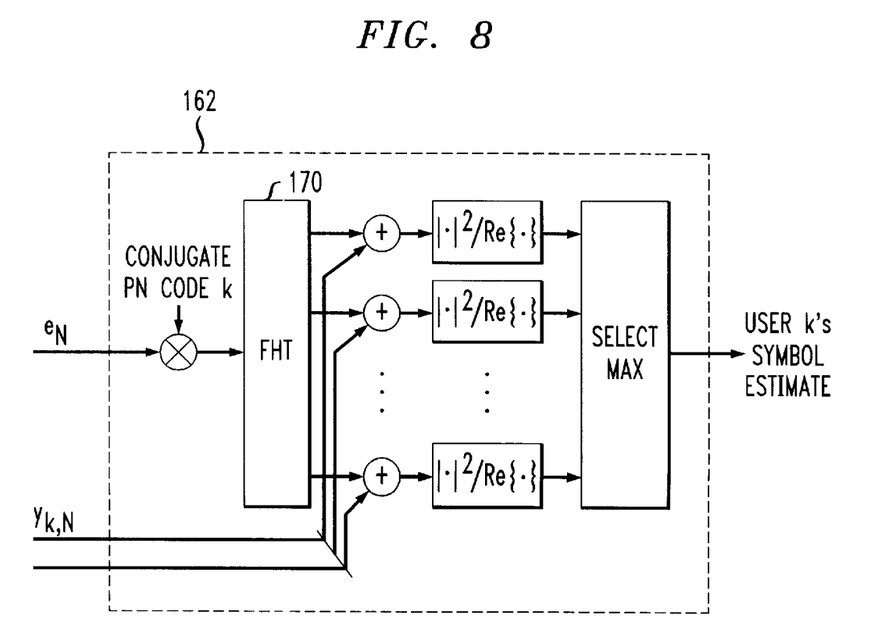
FIG. 8 is a schematic block diagram of a final reconstruction block or decision block for the PIC arrangement of FIG. 3.

A final decision block 162, of K final decision blocks 164, 166, 168 of the multistage interference canceler 130, is shown in FIG. 8. Similar to the reconstruction block 154 shown in FIG. 5, the final decision block 162 first despreads the residual interference signal $e_n$ from the final (Nth) stage of the miltistage interference canceler 130 and then computes its correlations with the M symbol waveforms using an FHT 170. The weight vector $y_{k,n}$ from the Nth stage is then added to the output of the FHT 170. The decision statistic for the kth user's symbol is computed by taking the real part or the squared magnitude of the resulting correlations, depending, respectively, on whether coherent or noncoherent demodulation is used. The final symbol decision is made by selecting the symbol corresponding to the maximum component of the decision statistic vector.

Having thus described the invention of the present application in detail and by reference to preferred embodiments thereof, it will be apparent that modifications and variations are possible without departing from the scope of the invention defined in the appended claims.

What is claimed is:

1. A method of decoding a spread spectrum composite signal, said composite signal comprising a plurality of user signals that have been modulated using M-ary orthogonal signals and spread with a plurality of respective codes, said method comprising a plurality of interference cancellation steps performed in succession in response to an input cancellation residue signal and input weight signals corresponding to preceding estimated correlation signals of said users to said M-ary orthogonal signals wherein each successive step comprises the performance for each one of said user signals of the following substeps:

despreading said input cancellation residue signal to generate a despread input cancellation residue signal;

correlating said despread input cancellation residue signal with said M-ary orthogonal signals to generate a first correlation signal;

adding said first correlation signal to an input weight signal for said user to generate a second correlation signal;

operating on said second correlation signal with a decision function to generate an output weight signal for said user;

performing an inverse transform of said output weight signal for said user to reconstruct said user signal; and spreading said user signal to generate an estimate of a portion of said composite signal for said user.

2. A method of decoding a spread spectrum composite signal as claimed in claim 1 wherein said M-ary orthogonal signals are M Walsh functions.

3. A method of decoding a spread spectrum composite signal as claimed in claim 2 wherein said step of correlating said despread input cancellation residue signal with said M-ary orthogonal signals to generate a first correlation signal comprises the step of taking the Fast Hadamard Transform of the despread input cancellation residue signal.

4. A method of decoding a spread spectrum composite signal as claimed in claim 3 wherein said step of performing an inverse transform of said output weight signal for said user to reconstruct said user signal comprises the step of taking the Inverse Fast Hadamard Transform of the output weight signal for said user.

5. A method of decoding a spread spectrum composite signal as claimed in claim 1 wherein for a first interference cancellation step said residue signal comprises a received signal and said input weight signals comprise zero signals.

6. A method of decoding a spread spectrum composite signal as claimed in claim 1 wherein said step of operating on said second correlation signal with a decision function to generate an output weight signal for said user comprises the step of operating on said second correlation signal with a sigmoid decision function.

7. A method of decoding a spread spectrum composite signal as claimed in claim 1 wherein said step of operating on said second correlation signal with a decision function to generate an output weight signal for said user comprises the step of operating on said second correlation signal with a sigmoid decision function defined as:

$$y_{k,n,m} = \hat{a}_k \frac{\exp\left[\frac{\text{Re}\{\hat{a}_k^* x_{k,n,m}\}}{\sigma_{k,n}^2}\right]}{\sum_{l=1}^{M} \exp\left[\frac{\text{Re}\{\hat{a}_k^* x_{k,n,l}\}}{\sigma_{k,n}^2}\right]}.$$

8. A method of decoding a spread spectrum composite signal as claimed in claim 1 wherein said step of operating on said second correlation signal with a decision function to generate an output weight signal for said user comprises the step of operating on said second correlation signal with a linear decision function defined as $y_{k,n,m}=x_{k,n,m}$.

9. A method of decoding a spread spectrum composite signal as claimed in claim 1 wherein said step of operating on said second correlation signal with a decision function to generate an output weight signal for said user comprises the step of operating on said second correlation signal with a linear decision function.

10. A method for interference cancellation from a received spread spectrum composite signal, said received composite signal comprising a plurality of user signals that have been modulated using M-ary orthogonal signals and spread with a plurality of respective spreading codes, said method comprising the steps of:

despreading said received composite signal with a plurality of respective despreading codes corresponding to said plurality of respective spreading codes to form a despread composite signal for each user;

correlating said despread composite signal for each user with said M-ary orthogonal signals comprising M Walsh functions to generate a correlation signal for each user by taking the Fast Hadamard Transform of the despread composite signal;

operating on said correlation signal for each user with a decision function to generate a weight signal for each user;

reconstructing an estimated received signal for each user from said weight signal;

combining said estimated received signals for all of said users to generate an estimated received composite signal; and subtracting said estimated received composite signal from said received composite signal to generate a cancellation residue signal.

11. A method for interference cancellation from a spread spectrum composite signal as claimed in claim 10 wherein said step of reconstructing an estimated received signal for each user from said weight signal comprises the step of taking the Inverse Fast Hadamard Transform of said weight signal for each user.

12. Apparatus for decoding a spread spectrum composite signal, said composite signal comprising a plurality of user signals that have been modulated using M-ary orthogonal signals and spread with a plurality of respective codes, said apparatus comprising a plurality of interference cancellation stages each responsive to an input cancellation residue signal and input weight signals corresponding to preceding estimated correlation signals of said users to said M-ary orthogonal signals wherein each stage comprises for each of said user signals:

means for despreading said input cancellation residue signal to generate a despread input cancellation residue signal;

means for correlating said despread input cancellation residue signal with said M-ary orthogonal signals to generate a first correlation signal;

means for adding said first correlation signal to an input weight signal for said user to generate a second correlation signal;

means for operating on said second correlation signal with a decision function to generate an output weight signal for said user;

means for performing an inverse transform of said output weight signal for said user to reconstruct said user signal; and means for spreading said user signal to generate an estimate of a portion of said composite signal for said user.

13. Apparatus for decoding a spread spectrum composite signal as claimed in claim 12 wherein said M-ary orthogonal signals are M Walsh functions.

14. Apparatus for decoding a spread spectrum composite signal as claimed in claim 13 wherein said means for correlating said despread input cancellation residue signal with said M-ary orthogonal signals provides for taking the Fast Hadamard Transform of the despread input cancellation residue signal.

15. Apparatus for decoding a spread spectrum composite signal as claimed in claim 14 wherein said means for performing an inverse transform of said output weight signal for said user provides for taking the Inverse Fast Hadamard Transform of the output weight signal for said user.

16. Apparatus for decoding a spread spectrum composite signal as claimed in 15 claim wherein said means for operating on said second correlation signal with a decision function to generate an output weight signal for said user provides for operating on said second correlation signal with a sigmoid decision function.

17. Apparatus for decoding a spread spectrum composite signal as claimed in claim 15 wherein said means for operating on said second correlation signal with a decision function to generate an output weight signal for said user provides for operating on said second correlation signal with a sigmoid decision function defined as:

$$y_{k,n,m} = \hat{a}_k \frac{\exp\left[\frac{\mathrm{Re}\{\hat{a}_k^* x_{k,n,m}\}}{\sigma_k^2}\right]}{\sum_{l=1}^{M}\exp\left[\frac{\mathrm{Re}\{\hat{a}_k^* x_{k,n,l}\}}{\sigma_k^2}\right]}.$$

18. Apparatus for decoding a spread spectrum composite signal as claimed in 15 claim wherein said means for operating on said second correlation signal with a decision function to generate an output weight signal for said user provides for operating on said second correlation signal with a linear decision function.

19. Apparatus for decoding a spread spectrum composite signal as claimed in 15 claim wherein said means for operating on said second correlation signal with a decision function to generate an output weight signal for said user provides for operating on said second correlation signal with a linear decision function defined as $y_{k,n,m} = x_{k,n,m}$.

* * * * *

UNITED STATES PATENT AND TRADEMARK OFFICE
CERTIFICATE OF CORRECTION

PATENT NO. : 6,363,103 B1
DATED : March 26, 2002
INVENTOR(S) : R. Michael Buehrer, Sridhar Gollamudi and Seven P. Nicoloso It is certified that error appears in the above-identified patent and that said Letters Patent is hereby corrected as shown below:

Title page,
Item [54], title "MODUATION" should read -- MODULATION --.

Column 1,
Line 4, "MODUATION" should read -- MODULATION --.
Line 33, "user'" should read -- users' --.
Line 35, "user'" should read -- users' --.
Line 40, "being treating" should read -- being treated --.
Line 53, "user'" should read -- users' --

Column 2,
Line 28, "user'" should read -- users' --

Column 5,
Line 57, "user'" should read -- users' --

Column 6,
Line 1, "$y_{1,n}, \ldots, y_{k,n}$" should read -- $\mathbf{y}_{1,n}, \ldots, \mathbf{y}_{k,n}$ --.
Line 2, "$y_{k,n}$" should read -- $\mathbf{y}_{k,n}$ --.
Line 6, "$y_{1,0}, \ldots, y_{k,0}$" should read -- $\mathbf{y}_{1,0}, \ldots, \mathbf{y}_{k,0}$ --.
Line 35, "$y_{k,n-1}$" should read -- $\mathbf{y}_{k,n-1}$ --.
Line 59, "$\sigma_{k,n}^2$" should read -- $\sigma^2_{k,n}$ --.
Line 65, "$\sigma_{k,n}^2$" should read -- $\sigma^2_{k,n}$ --.

Column 7,
Line 11, "$\sigma_{k,n}^2$" should read -- $\sigma^2_{k,n}$ --.
Line 13, "i.e.,," should read -- i.e., --.
Line 25, "vector $y_{k,n}$" should read -- vector $\mathbf{y}_{k,n}$ --.
Line 35, "miltistage" should read -- multistage --.

Column 8,
Line 61, "signals and" should read -- signals comprising M Walsh functions and --.
Line 67, "user;" should read -- user by taking the Fast Hadamard Transform of the despread composite signal. --.

UNITED STATES PATENT AND TRADEMARK OFFICE
CERTIFICATE OF CORRECTION

PATENT NO. : 6,363,103 B1
DATED : March 26, 2002
INVENTOR(S) : R. Michael Buehrer, Sridhar Gollamudi and Seven P. Nicoloso It is certified that error appears in the above-identified patent and that said Letters Patent is hereby corrected as shown below:

<u>Column 10,</u>
Line 19, "15 claim" should read -- claim 15 --.
Lines 30-35, $$y_{k,n,m} = \hat{a}_k \frac{\exp\left[\dfrac{\text{Re}\{\hat{a}_k^* x_{k,n,m}\}}{\sigma_k^2}\right]}{\sum_{l=1}^{M}\exp\left[\dfrac{\text{Re}\{\hat{a}_k^* x_{k,n,l}\}}{\sigma_k^2}\right]}$$

should read $$y_{k,n,m} = \hat{a}_k \frac{\exp\left[\dfrac{\text{Re}\{\hat{a}_k^* x_{k,n,m}\}}{\sigma_{k,n}^2}\right]}{\sum_{l=1}^{M}\exp\left[\dfrac{\text{Re}\{\hat{a}_k^* x_{k,n,l}\}}{\sigma_{k,n}^2}\right]}$$

Line 37, "15 claim" should read -- claim 15 --.
Line 43, "15 claim" should read -- claim 15 --.

Signed and Sealed this

Sixth Day of August, 2002

*Attest:*

*Attesting Officer*

JAMES E. ROGAN
*Director of the United States Patent and Trademark Office*